June 19, 1956   D. RINGO ET AL   2,751,034
FLUID TREATING APPARATUS

Filed Oct. 17, 1952   9 Sheets-Sheet 1

FIG. 1.

INVENTORS
DAN RINGO
ERNEST B. MILLER
BY *Adams & Bush*
ATTORNEYS

INVENTORS
DAN RINGO
ERNEST B. MILLER

INVENTORS
DAN RINGO
ERNEST B. MILLER

June 19, 1956

D. RINGO ET AL 2,751,034

FLUID TREATING APPARATUS

Filed Oct. 17, 1952

INVENTORS
DAN RINGO
ERNEST B. MILLER

BY *Adams & Bush*

ATTORNEYS

INVENTORS
DAN RINGO
ERNEST B. MILLER

United States Patent Office 2,751,034
Patented June 19, 1956

---

2,751,034

FLUID TREATING APPARATUS

Dan Ringo and Ernest B. Miller, Houston, Tex., assignors to Adsorption Research Corporation, Houston, Tex., a corporation of Texas Application October 17, 1952, Serial No. 315,309

10 Claims. (Cl. 183—4.7)

This invention relates to fluid treating apparatus of the type in which fluids, either liquid or gaseous, are brought into contact with the treating material, either a reactant material to effect a chemical reaction, and/or an adsorbent material to adsorb liquid or gaseous products from the fluid being treated, and in which the treating material is stripped of its adsorbed products and/or is regenerated for further use. The present invention has more particular reference to fluid treating apparatus of the so-called continuous type.

One object of the present invention is to provide a novel and improved fluid treating apparatus providing for a plurality of separate, distinct and continuous flows of fluid therethrough and in which a plurality of closed vessels containing fluid treating material have one of their ends in communication with a first distribution chamber and the other of their ends in communication with a second distribution chamber; a rotatable valve mounted in each distribution chamber; and means for synchronously rotating the valves so that the flows of fluids through the apparatus will be directed successively through each of the vessels containing fluid treating material.

Another object of the invention is to provide fluid treating apparatus, as characterized above, in which a large surface area of relatively thin beds of fluid treating material offering a minimum of resistance to the flow of the fluids is condensed into a small cubic space.

Another object of the invention is to provide fluid treating apparatus, as characterized above, in which baffle members are provided to insure an even flow of the fluid through the treating material, thereby making effective use of all of the treating material and increasing the efficiency and capacity of the apparatus.

Another object of the invention is to provide fluid treating apparatus, as characterized above, in which the vessels containing the fluid treating material have readily accessible and removable cover plates so that the fluid treating material may readily be removed and replaced.

A further and more specific object of the present invention is to provide an improved apparatus for removing moisture and condensable hydrocarbons from natural gas.

Other objects and advantages of the invention will appear in the specification when considered in connection with the accompanying drawings, in which.

In general, the present invention comprises an elongated upright cylindrical pressure vessel having enlarged distribution chambers mounted on its opposite ends with a rotatable double-faced valve mounted in each chamber; a plurality of inlet conduits for the fluid being treated connected to the top of the upper distribution chamber; a plurality of outlet conduits connected to the bottom of the lower distribution chamber; a plurality of upright cylindrical pressure vessels, each adapted to hold fluid treating material and having an inlet pipe connecting its upper end portion to the bottom of the upper distribution chamber and an outlet pipe connecting its bottom portion to the top of the lower distribution chamber, and means for synchronously rotating the valves in the distribution chambers, whereby each of the fluids admitted to the upper distribution chamber through the inlet conduits connected thereto will flow through successive groups of the pressure vessels containing the fluid treating material and from there to the lower distribution chamber and out through their corresponding outlet conduits.

While the apparatus of the present invention may be employed for treating fluids, either liquid or gaseous, for various purposes, it will be described, by way of illustration, as used to remove moisture and condensable hydrocarbons from natural gas.

Referring now to Figs. 1 to 5, inclusive, there is shown one embodiment of fluid treating apparatus constructed in accordance with the present invention. As there shown, the apparatus comprises an upright cylindrical pressure vessel 20; an upper cylindrical distribution chamber 21 secured to the top of the vessel 20; a lower cylindrical distribution chamber 22 secured to the bottom end of the vessel 20; suitable framework, indicated generally at 23, for supporting the vessel 20 and the distribution chambers in a raised position; a rotatable vertical shaft 24 extending through the pressure vessel 20 and journaled and supported by suitable radial bearings mounted in the closure discs of the upper and lower distribution chambers, with its lower end extending through a suitable shaft seal secured to the bottom of the closure disc of the lower distribution chamber; a vertical shaft 25 coupled to the bottom end of the shaft 24 and connected to suitable differential gearing, indicated at 26, driven by a motor 27; a double-faced rotatable disc valve 28 mounted within each of the distribution chambers 21, 22 and fixedly secured on the shaft 24 for rotation therewith; a plurality of fluid inlet conduits, three being shown, 29, 30, 31, connected to the top of the upper distribution chamber 21 for admitting fluids thereto; a plurality of fluid outlet conduits, three being shown, 32, 33, 34 connected to the bottom of the lower distribution chamber 22 for exhausting fluids therefrom; and a plurality of fluid treating cylindrical pressure vessels 35 supported in a raised upright position encircling the vessel 20, by a suitable framework, indicated generally at 36, with each of the vessels having an inlet pipe 37 connecting its upper end portion to the bottom of the upper distribution chamber 21 and an outlet pipe 38 connecting its lower end portion to the top of the lower distribution chamber 22.

Figure 4:
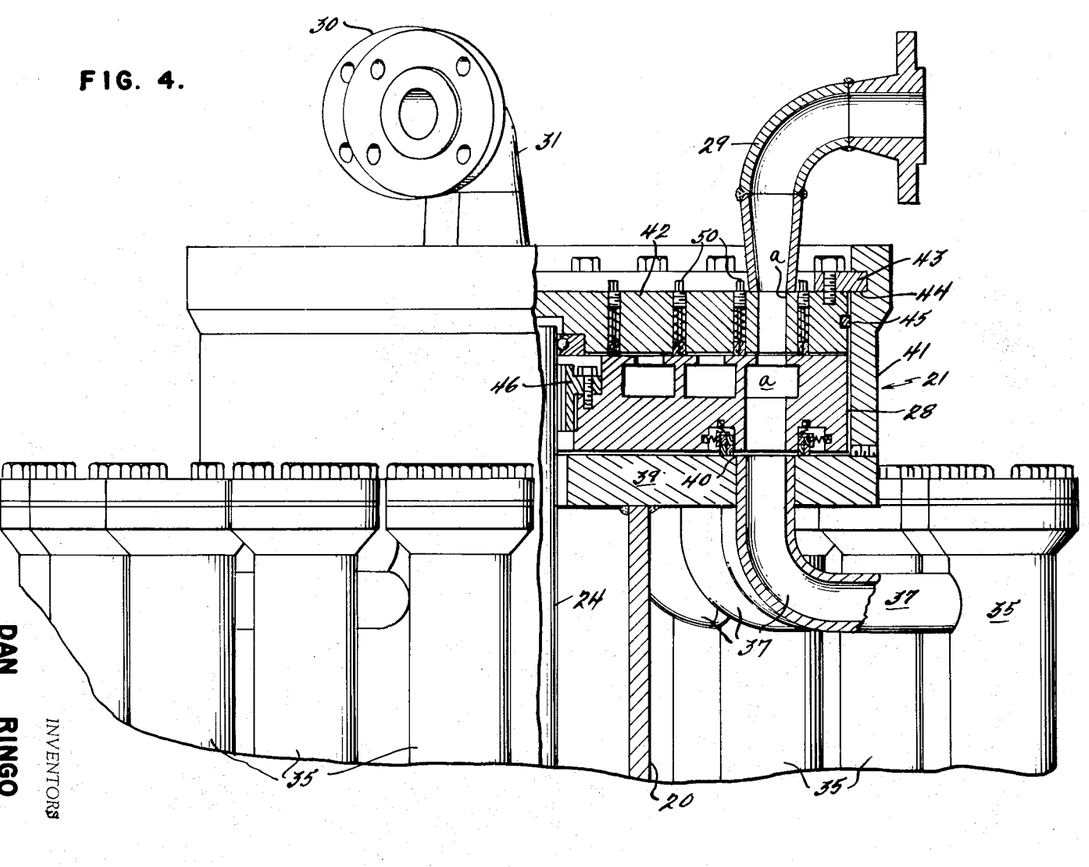
Fig. 4 is a fragmentary elevational view, partly in vertical cross section and with parts broken away, showing the upper end of the apparatus shown in Fig. 1.
Figure 5:
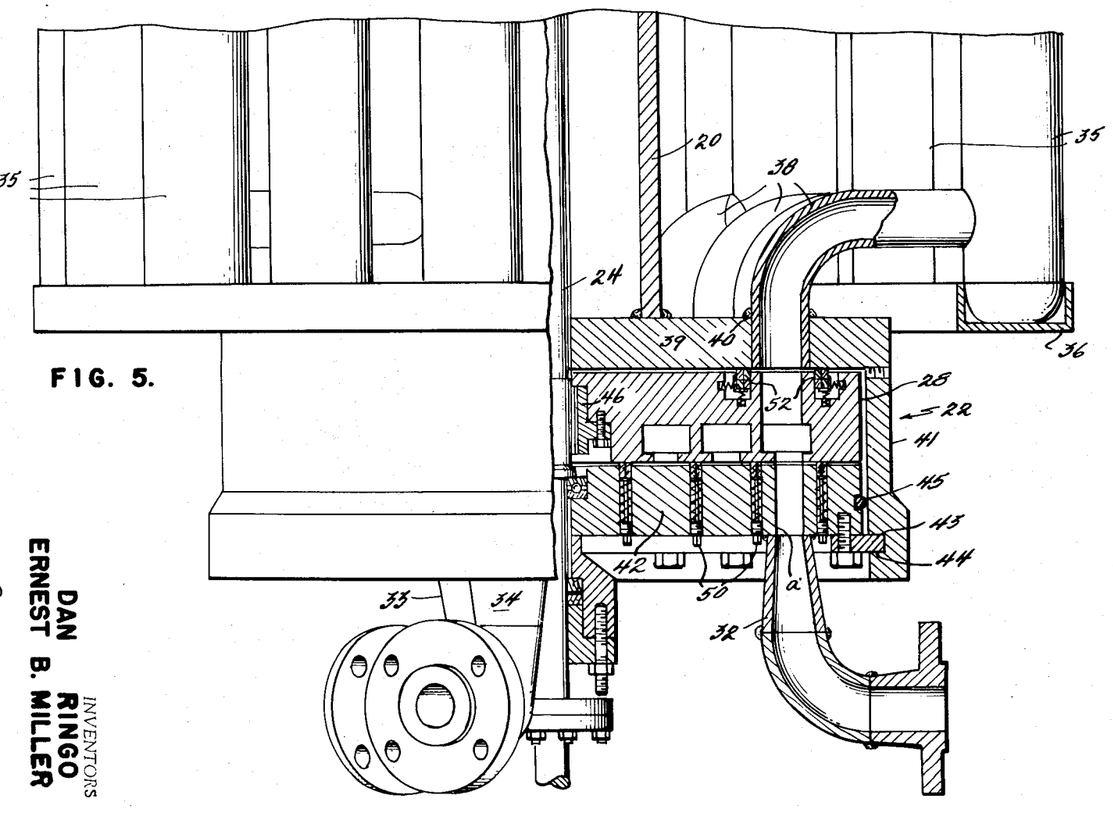
Fig. 5 is a view similar to that shown in Fig. 4, but showing the bottom end of the apparatus shown in Fig. 1.
Figure 6:
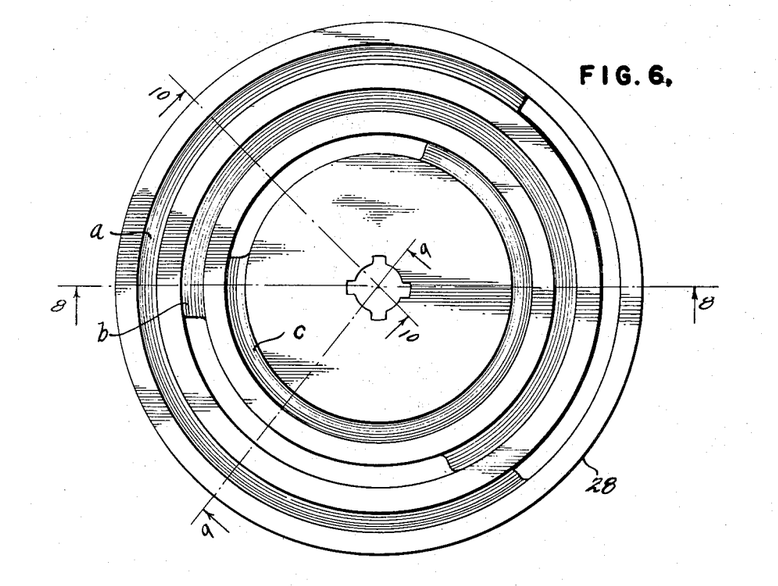
Fig. 6 is a plan view of one surface of a rotatable disc valve, with the packing rings omitted.
Figure 7:
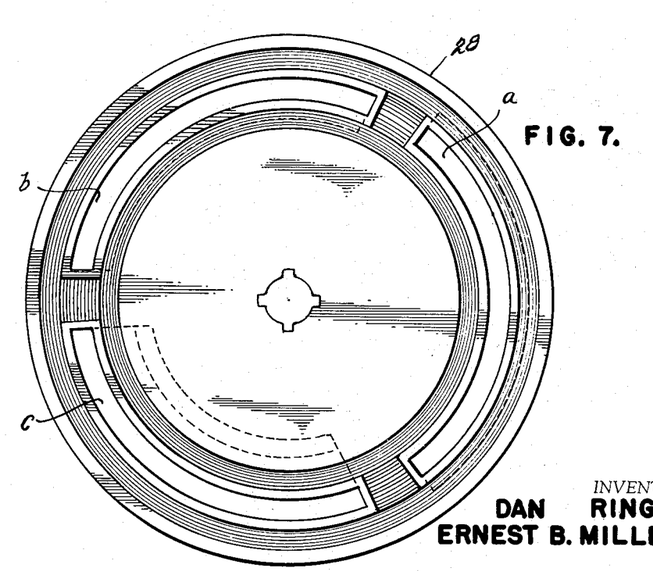
Fig. 7 is a plan view of the other surface of the rotatable disc valve shown in Fig. 6, with the packing rings and seal packing omitted.
Figure 8:
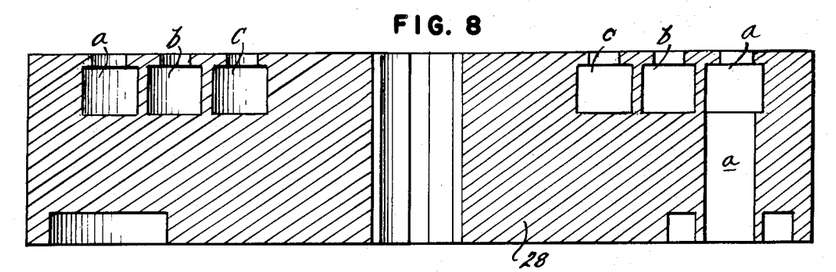
Fig. 8 is a vertical cross sectional view taken on the line 8—8 of Fig. 6.
Figures 9, 10, 11:
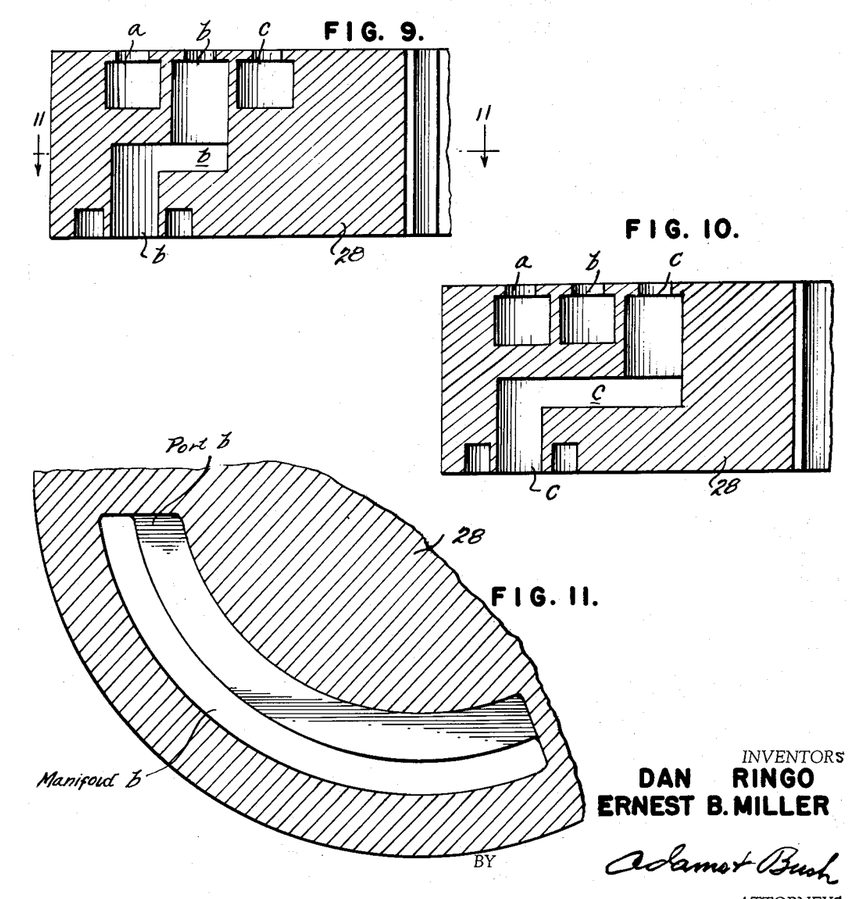
Fig. 9 is a vertical cross sectional view, taken on the line 9—9 of Fig. 6.
Figure 10 is a vertical cross sectional view, taken on the line 10—10 of Fig. 6.
Fig. 11 is a horizontal cross sectional view, taken on the line 11—11 of Fig. 9.

The upper and lower distribution chambers are identical in construction and, as shown in Figs. 4 and 5, each comprises an inner tube sheet disc 39 secured to an end of the cylindrical vessel 20, as by welding, and having a plurality of circular openings 40 extending therethrough, the openings being spaced from each other and formed in a circular row spaced inwardly from the periphery of the discs; a cylindrical collar 41 which forms the side wall of the chamber and which may be formed integral with the disc 39, as shown, or welded thereto; a closure disc 42 provided with three circumferentially and radially spaced inlet openings, which, for the purpose of clarity of description are designated "a," "b" and "c," respectively, secured in the outer end of the chamber, as by means of a split shear ring 43 bolted thereto and fitted into a circumferential recess 44 formed in the inner surface of the collar; and an O-ring packing 45 mounted between the closure disc 42 and the collar 41 to insure the gas-tightness of the chamber.

The three inlet conduits 29, 30 and 31, are secured to the closure disc 42 of the upper distribution chamber 21, as by welding, for communication with the interior of the chamber through openings "a," "b" and "c," respectively. The three outlet conduits 32, 33 and 34 are secured to the closure disc 42 of the lower distribution chamber 22, as by welding, for communication with the interior of the chamber through openings "a," "b" and "c," respectively. The upper ends of the inlet pipes 37 which connect the pressure vessels 35 to the upper distribution chamber 21, are fitted into the openings 40 formed in the tube sheet disc 39 of the upper distribution chamber. The lower ends of the outlet pipes 38 which connect the pressure vessels 35 to the lower distribution chamber 22, are fitted into the openings 40 formed in the tube sheet disc 39 of the lower distribution chamber.

The double-faced disc valves 28 are identical in construction and each is mounted within its respective distribution chamber between the tube sheet disc 39 and the closure disc 42 and is fixedly connected to the shaft 24 for rotation therewith, as by means of a splined collar 46 mounted on the shaft and bolted to the disc valve.

The details of construction of the double-faced disc valve 28 are best shown in Figs. 6 to 11, inclusive. As there shown, the upper face of the disc valve has a plurality of radially spaced concentric channels formed therein, three such channels being shown, and, for the purpose of clarity of description, designated fluid annulus "a," "b" and "c," respectively (see Figs. 6 and 8). In the particular embodiment illustrated, the outer channel "a" and inner channel "c" are separated from the intermediate channel "b" by walls which are T-shaped in cross section. The bottom face of the disc valve 28 has a plurality of circumferentially spaced arc-shaped channels formed therein, three such channels being shown, and, for the purpose of clarity, designated manifolds "a," "b" and "c," respectively (see Figs. 7 and 8). The channels "a," "b" and "c" are of the same length and have equal radii.

A plurality of generally trapezoidal-shaped circumferentially spaced passageways are formed in the disc valve, three such passageways being shown, and, for the purpose of clarity of description, designated ports "a," "b" and "c," respectively. The port "a" provides communication between a portion of the bottom of the annulus "a" formed in the upper face of the valve disc and the manifold "a" formed in the bottom face of the disc valve (see Fig. 8); the port "b" provides communication between a portion of the bottom of the annulus "b" and the manifold "b" (see Figs. 9 and 11); and the port "c" provides communication between the annulus "c" and the manifold "b" (see Fig. 10).

The disc valves 28 are mounted within their respective distribution chambers with their surfaces containing the manifolds "a," "b" and "c" slightly spaced from the tube sheet discs 39 and with each of the manifolds in vertical alignment with a group of the circular openings 40 in the tube sheet discs and with their surfaces containing the annular channels "a," "b" and "c" slightly spaced from the closure discs 42 and with the annular channels in vertical alignment with the inlet openings "a," "b" and "c," respectively, formed in the closure discs 42.

The manner in which the annular channels "a," "b" and "c" and the manifolds "a," "b" and "c" are sealed off from the space within the distribution chambers is best shown in Figs. 4, 5, 12, 13 and 14. As there shown, the open tops of the annular channels "a," "b" and "c" in the disc valve 28 are sealed off from the space between the closure disc 42 and the surface of the valve disc by means of annular seals 47, each seated in an annular recess formed in the inner surface of the closure disc with their lower ends pressed into engagement with the surface of the valve disc by means of split, flat, annular metal strips 48 resting on the upper ends of the seals and pressed downwardly thereon, as by means of a plurality of coiled springs 49 mounted in circumferentially spaced vertical openings extending through the closure disc with an adjusting and pressure sealing plug 50 threaded in each opening for adjusting the pressure of the spring. Each of the adjusting nuts may be provided with a depending stem 51 extending downwardly through the spring to hold it in upright position. Each of the seals 47, preferably, and as shown, comprises a plurality of annular strips of packing generally rectangular in cross section and made of any suitable material, such as teflon or silica impregnated asbestos.

The open bottoms of the three manifolds "a," "b" and "c" formed in the disc valve 28 are sealed off from the space between the inner surface of the disc 39 and the disc valve by means of annular seals 52, each seated in an annular recess formed in the inner surface of the disc valve with their lower ends pressed into sealing engagement with the surface of the disc 39.

Figures 12, 13, 14:
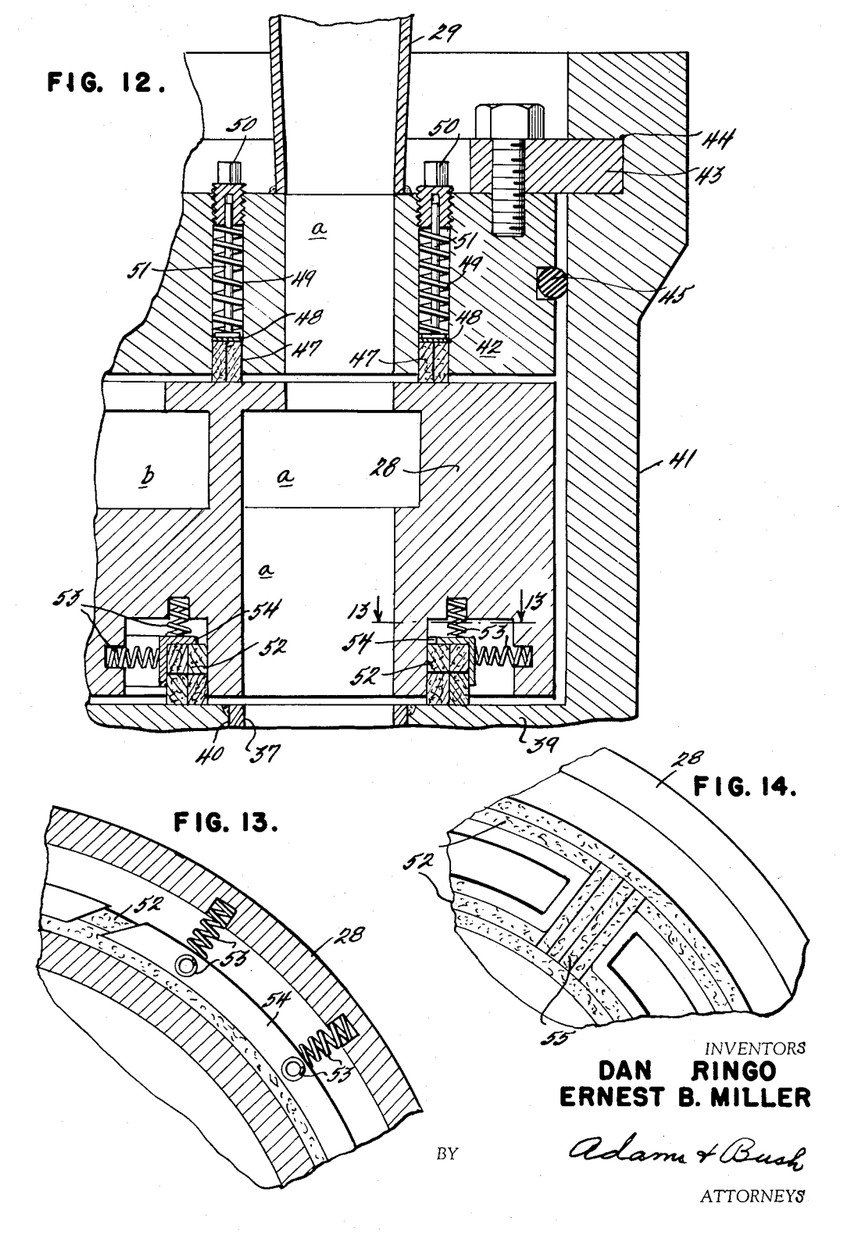
Fig. 12 is a fragmentary detail view showing the manner in which the packing rings between the rotatable disc valve and the stationary end wall members of the distribution chambers are mounted.
Fig. 13 is a horizontal cross sectional view, taken on the line 13—13 of Fig. 12.
Fig. 14 is a fragmentary detail view showing the manner in which the packing is mounted in a cross-seal.

Each of the annular seals 52 is pressed into engagement with the inner surface of the disc 39 and the side walls of the recess in which the seal is mounted, adjacent the manifold, as by means of a plurality of circumferentially spaced coiled springs 53 fitted into circular recesses formed in the top and a side wall of the recess and engaging the top and side legs of a split annular retaining ring 54, made of angle iron (see Figs. 12 and 13). Each of the seals 52, preferably, and as shown, comprises a plurality of annular strips of packing, generally rectangular in cross section and made of any suitable material such as teflon or slicia impregnated asbestos.

Obviously, any leakage of fluids past the seals 47 and 52 into the distribution chamber and the pressure vessel 20 serves to equalize the pressure on both sides of the seals and increases their sealing efficiency. The O-ring packings 45 and the shaft seal serve to prevent leakage from the distribution chambers and the pressure vessel 20.

The three manifolds "a," "b" and "c" are sealed off from each other by means of cross seals 55, each seated in a radially extending recess formed in the surface of the disc valve between the adjacent end walls of the manifolds "a," "b" and "c" and opening into the adjacent annular recess in which the annular seals 52 are seated. Each cross seal is tightly wedged in its recess with its ends in sealing engagement with the adjacent side walls of the annular seals 52 and with its bottom surface pressed into tight sealing engagement with the inner surface of the disc 39 (see Fig. 14).

The widths of the manifolds "a," "b" and "c" are substantially the same as the internal diameters of the circular openings 40 in the tube sheet discs 39 and each of the cross seals 55 is of a width greater than the diameters of the circular openings 40, so that each cross seal can effectively seal off one of the openings 40.

Each of the openings 40 formed in the tube sheet disc 39 of the lower distribution chamber 22 is in vertical alignment with a corresponding one of the openings 40 formed in the tube sheet disc 39 of the upper distribution chamber 21 and each of the three cross seals 55 which separate the manifolds "a," "b" and "c" formed in the lower valve disc 28 is in vertical alignment with a corresponding one of the cross seals 55 which separate the manifolds "a," "b" and "c" formed in the upper valve disc 28.

When the rotary disc valves 28 are stationary, with each of the cross seals 55 sealing off one of the openings 40 in the tube sheet discs 39, the foregoing arrangement, in effect, divides the pressure vessels 35 into three groups, with one group connected to communicate with the manifolds "a," one group connected to communicate with the manifolds "b," and one group connected to communicate with the manifolds "c," so that three separate, distinct and continuous flows of fluid may pass through the apparatus. Each flow entering the upper distribution chamber 21 by means of one of the inlet conduits 29, 30 or 31, thence through one of the groups of pressure vessels 35 into the lower distribution chamber 22 and out through one of the outlet conduits 32, 33 or 34. As the upper and lower disc valves rotate, each of the flows of fluid will successively pass through the three groups of pressure vessels 35.

Figure 15:
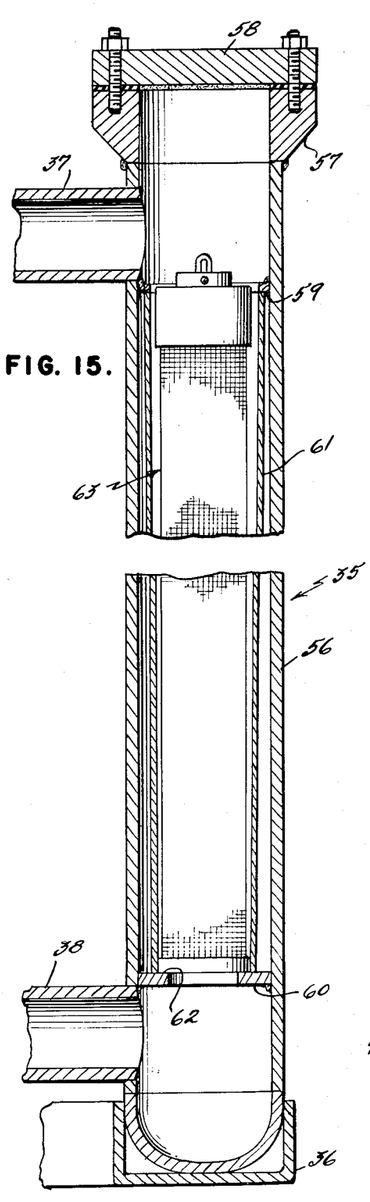
Fig. 15 is a vertical sectional view of one of the pressure vessels having a fluid treating material container mounted therein.

The fluid treating material containing pressure vessels 35 are identical in construction and, as shown in Fig. 15, each comprises an elongated hollow, cylindrical member 56 having a closed rounded bottom end and an open upper end provided with an integral flange 57, to which is secured, as by bolting, a removable cover plate 58.

Horizontally disposed and vertically spaced annular discs 59, 60 are mounted in the upper and lower end portions, respectively, of the member 56 and secured therein, as by welding, to form a gas-tight joint between the outer peripheral edges of the discs and the side walls of the member 56. The diameter of the opening in the upper disc 59 is greater than the diameter of the opening in the lower disc 60 and a generally frusto-conically shaped, hollow baffle member 61 extends between the discs 59 and 60 with its top end fitted in the opening in the upper disc 59 and its lower end secured to the disc 60, as by welding, along a circle spaced outwardly from the peripheral edge of the opening therein to leave an annular ledge 62 surrounding the opening. The annular ledge 62 forms a support for an elongated annular fluid treating material container 63. The container 63 is removably mounted within the frusto-conically shaped baffle member 61, with its bottom end resting on the ledge 62 and with its upper end extending through the opening in the upper disc 59.

The inlet pipe 37 is connected, as by welding, to the vessel 35 at a point above the upper annular disc 59 and the outlet pipe 38 is connected, as by welding, to the vessel 35 at a point below the lower annular disc 60, as shown in Fig. 15.

Figure 16:
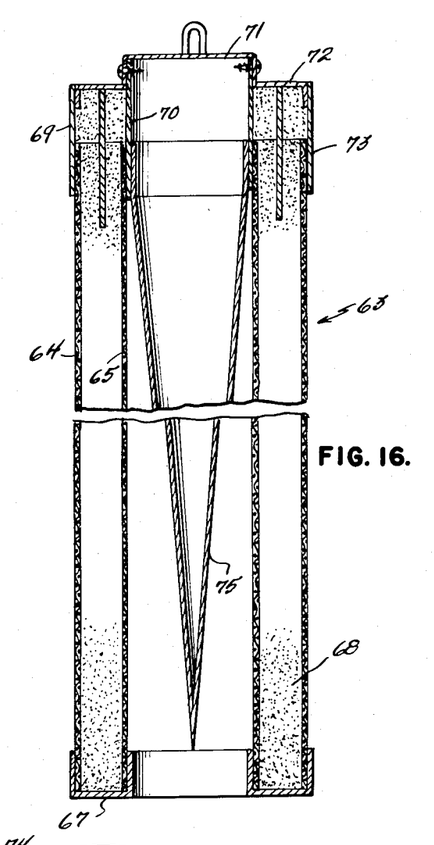
Fig. 16 is a vertical sectional view, with parts broken away, of the fluid treating material container shown in Fig. 15.
Figure 17:
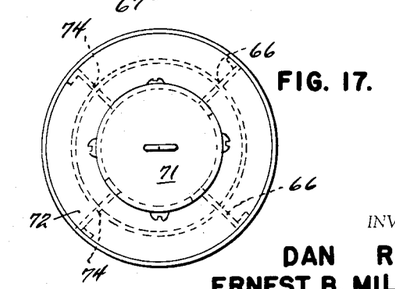
Fig. 17 is a plan view of the container shown in Fig. 16.

The containers 63 are identical in construction and, as shown in Figs. 16 and 17, each comprises two concentric tubular screens 64, 65 held in spaced-apart relation by a plurality of longitudinal radial fins 66, with the annular space between the screens closed at the bottom, as by a flanged annular plate 67. The mesh of the screens is such as to retain a granular fluid treating material 68 in the annular space between the screens. In the instant case, the fluid treating material 68 may be any adsorbent having characteristics substantially like silica gel or the gel of other activated hydrous oxides. Preferably, silica gel is used.

Each of the containers 63 is closed at its top by means of concentric hoops or metal bands 69, 70 mounted on the concentric screens 64, 65, and a cover plate 71 detachably connected to the inner hoop or band 70, as by screws, and having a depending annular flange 72 fitting between the hoops or bands 69, 70. A depending cylindrical fin 73 is secured to the flange 72 and projects downwardly between and below the hoops or bands 69, 70, and fits in slits 74 formed in the upper ends of the radial fins 66, all as shown in Figs. 16 and 17. The construction is such that, as the silica gel settles down, leaving a space between the top portion of the wire screens devoid of silica gel, the fin 73 will prevent fluid from passing through the space.

Mounted within the inner wire screen 65 is an inverted substantially conically shaped baffle member 75. The baffle member 75 is closed at its apex which extends downwardly to a point near the bottom of the container and has its upper peripheral edge suitably secured to the band 70, as by welding. Preferably, the baffle member 75 is made of thin sheet metal.

When the container 63 is mounted within the hollow member 61, as shown in Fig. 15, the elongated annular space between the walls of the member 61 and the inverted conical baffle member 75 forms an elongated frusto-conically shaped duct which is annular in cross section. The annular container, filled with silica gel, is positioned in the duct between the members 61 and 75 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the baffle members 61 and 75, the entire barrier area is made use of with resultant increase in efficiency, capacity, and economy.

Figure 18:
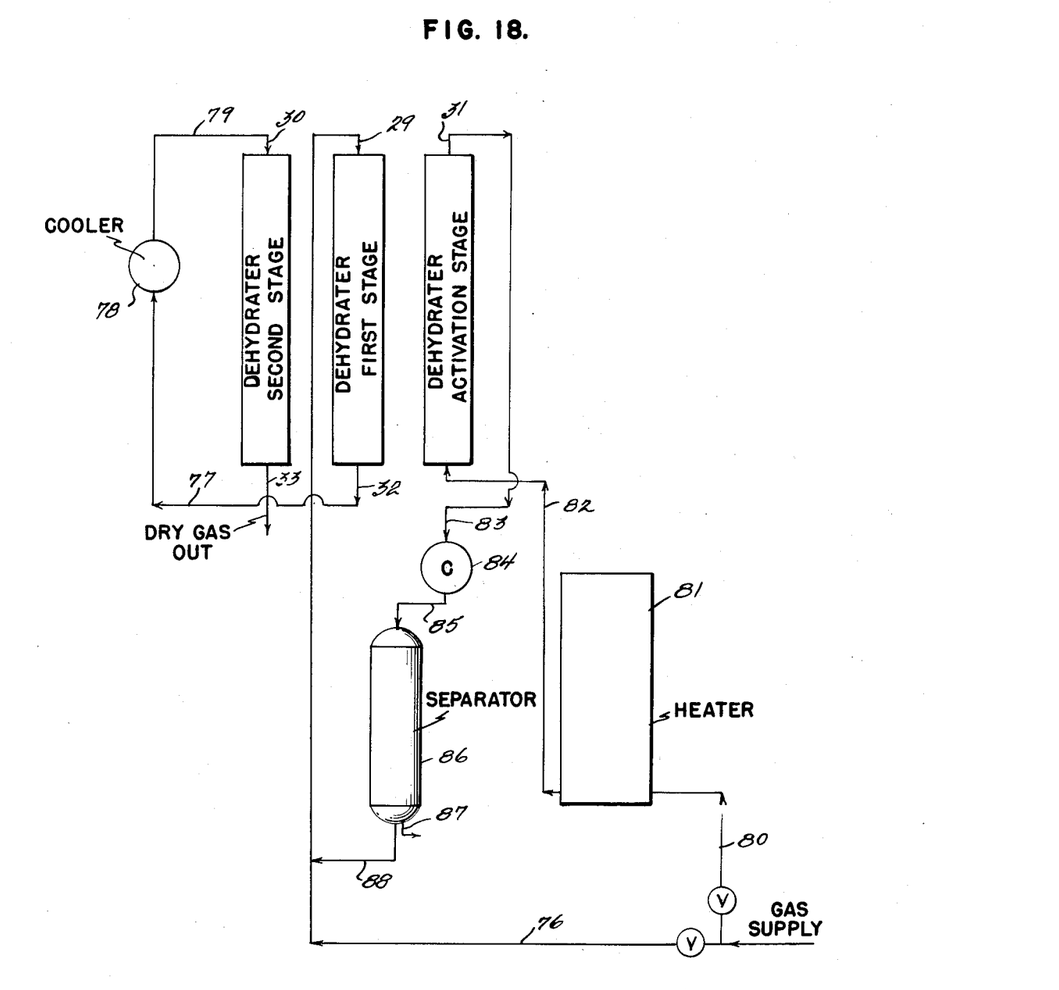
Fig. 18 is a schematic view showing the course of the fluid being treated through the first and second dehydration zones of the apparatus and the flow of regenerating fluid through the activation zone of the apparatus.

The manner in which the apparatus of the present invention may be employed to remove water vapor and condensable hydrocarbons from wet natural gas, as well as the auxiliary apparatus required, is schematically shown in Fig. 18.

As there shown, the wet natural gas from which moisture and condensable hydrocarbons are to be removed, is supplied under high pressure by pipe line 76 and enters the upper distribution chamber 21 of the fluid treating apparatus through inlet conduit 29 and passes through inlet opening "a" in the closure disc 42 into the annular channel or annulus "a" formed in the upper surface of the valve disc 28. From annulus "a" the gas passes through port "a" into manifold "a" formed in the bottom surface of the valve disc 28. From manifold "a" the gas passes through openings 40 formed in the tube sheet disc 39 and inlet pipes 37 into the upper end portions of the group of pressure vessels 35 which are at that time in communication with manifold "a." The gas passes down through the vessels 35 and through the silica gel beds therein into the bottoms of the vessels. The baffle members 61 and 75 within the vessels 35 insure a substantially uniform flow and distribution of the wet gas through the silica gel beds which adsorb some of the moisture content from the gas. From the bottoms of the vessels 35 the now partially dried gas passes through outlet pipes 38 and openings 40 in the tube sheet disc 39 in the lower distribution chamber into manifold "a" formed in the upper surface of the valve disc 28 in the lower distribution chamber. From manifold "a" the gas passes through port "a" into the channel or annulus "a" formed in the bottom surface of the valve disc 28 and thence through opening "a" in the closure disc 42 into the outlet conduit 32.

From the outlet conduit 32, the partially dried gas passes through pipe line 77 into an intercooler 78, where it is cooled. The intercooler 78 may be of the water circulating type. From the intercooler, the gas passes through pipe line 79, inlet conduit 30, and inlet opening "b" in the closure disc 42 of the upper distribution chamber 21, into the annular channel or annulus "b" in the upper valve disc 28. From the annulus "b" the gas passes through port "b" into manifold "b" in the bottom of the valve disc 28. From the manifold "b" the gas passes through openings 40 formed in the disc 39 and inlet pipes 37 into the upper end portions of the group of pressure vessels 35 which are at the time in communication with manifold "b." The gas passes downwardly through the pressure vessels 35 of the second group and through the silica gel beds therein into the bottoms thereof. The remainder of the moisture content of the gas being adsorbed during its passage through the silica gel beds.

From the bottoms of the vessels 35 of the second group, the now dried gas passes through outlet pipes 38 and openings 40 in the tube sheet disc 39 in the lower distribution chamber into manifold "b" in the upper surface of the lower disc valve 28. From the manifold "b" the gas passes through port "b" into the annular channel or annulus "b" formed in the bottom surface of the valve disc 28 and thence through outlet opening "b" in the closure disc 42 into the outlet conduit 33, and from thence to the various points of use.

A portion of the incoming wet gas is diverted from the supply line 76, by means of a pipe line 80, through a heater 81, where its temperature is raised to from 300° F. to 600° F., depending upon its moisture content and the type of hydrocarbons to be recovered. From the heater 81, the heated gas passes through pipe line 82, inlet conduit 34, and inlet opening "c" in the closure disc 42 of the lower distribution chamber 22, into annular channel or annulus "c" in the lower valve disc 28. From the annulus "c" the heated gas passes through port "c" into manifold "c" in the top of the valve disc 28. From the manifold "c" the gas passes through openings 40 formed in the tube sheet disc 39 and inlet pipes 38 into the lower end portions of the group of pressure vessels 35 which are at that time in communication with the manifold "c." The heated gas passes upwardly through the pressure vessels of the third group and through the silica gel beds therein into the tops of the vessels. As the heated gas passes through the silica gel beds it removes the moisture and hydrocarbons therefrom. From the tops of the vessels 35 of the third group, the hot, moisture and hydrocarbon laden gas passes through outlet pipes 37 and openings 40 in the tube sheet disc 39 in the upper distribution chamber 21 into manifold "c" in the lower surface of the upper valve disc 28. From the manifold "c" the gaseous mixture passes through port "c" into the annular channel or annulus "c" formed in the top surface of the valve disc 28 and thence through outlet opening "c" in the closure disc 42 into the outlet conduit 31 and from there through pipe line 83 into condenser 84, where the moisture and hydrocarbons are condensed. The now cooled gas, with the condensate, pass from the condenser 84 through pipe line 85 to the separator 86, where the condensate is separated from the gas. The water and hydrocarbons are drained from the bottom of the separator by means of a drain line 87.

From the separator 86, the gas passes through pipe line 88 back into the supply line 76, where it is mixed with the incoming gas on the way to the first passage through the apparatus.

The gas being dehydrated makes two passages through groups of the silica gel containing pressure vessels, while the heated gas or reactivating medium makes a single passage through a group of the silica gel containing pressure vessels. For convenience in description, the pressure vessels which form the group through which the first dehydrating passage is made is called the first dehydration zone, the group through which the second dehydrating passage is made is called the second dehydrating zone, and the group through which the hot gas used for reactivation passes is called the reactivation zone.

Figure 1:
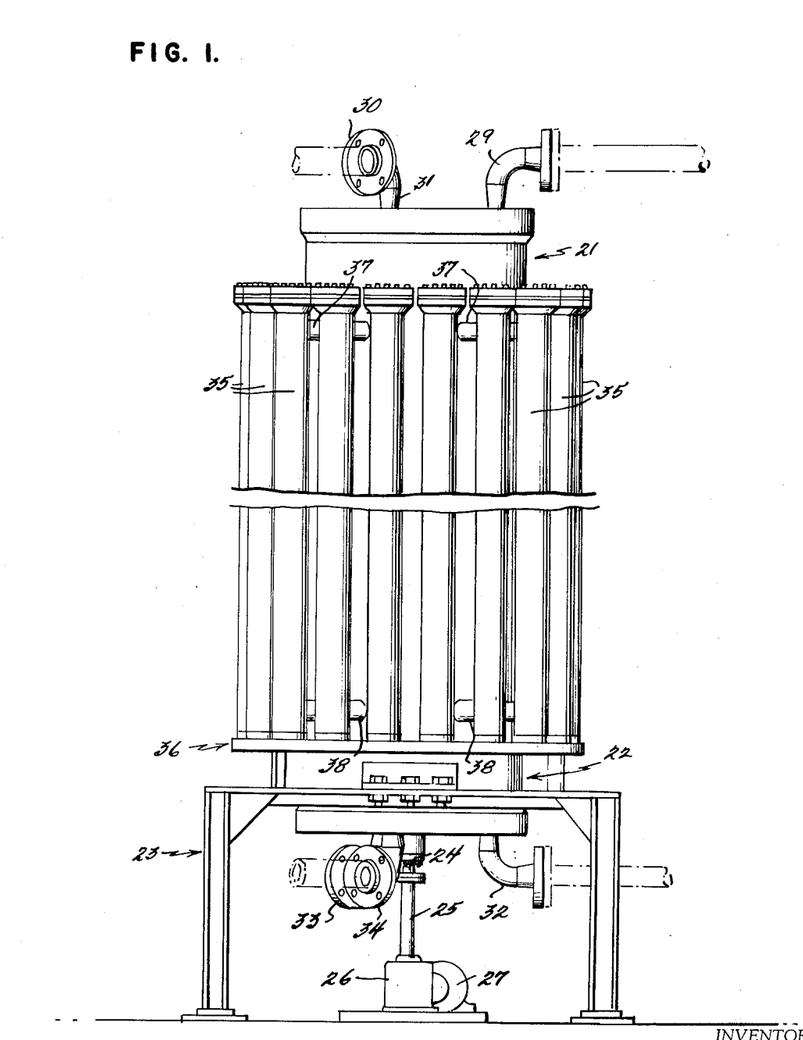
Fig. 1 is a side elevational view of one embodiment of fluid treating apparatus constructed in accordance with the present invention.
Figure 2:
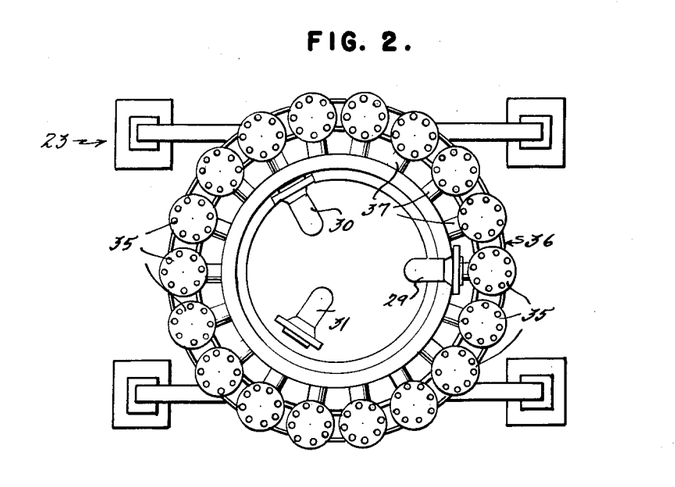
Fig. 2 is a plan of the apparatus shown in Fig. 1.
Figure 3:
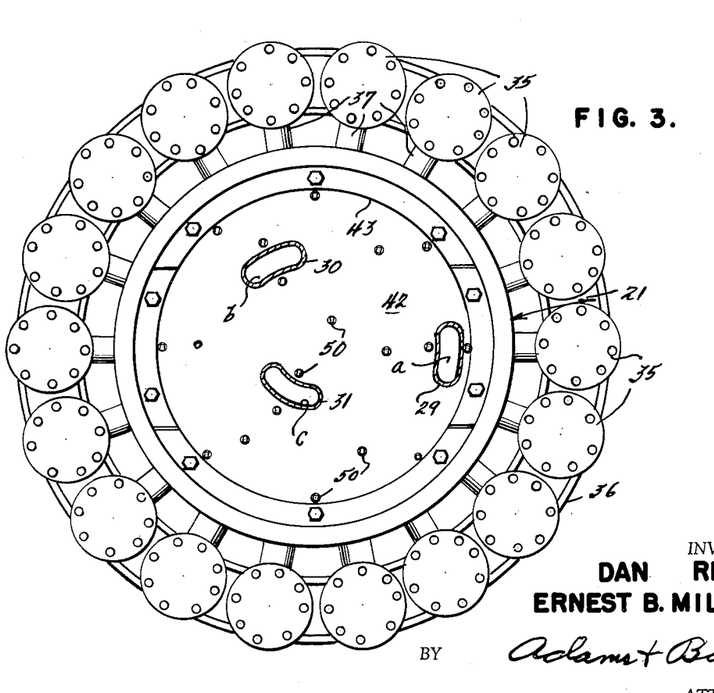
Fig. 3 is a plan view, on a larger scale, of the apparatus shown in Fig. 1, with the inlet conduits broken away.

In the particular embodiment of the invention illustrated, the valve discs 28 are rotated counterclockwise, as viewed in Fig. 2, and at a rate of 1 revolution every 10 minutes; thus, it will be seen that, as the disc valves 28 rotate, each of the three groups of pressure vessels 35 will be successively brought into communication with the manifolds "a," "b" and "c" in the upper and lower distribution chambers, so that each group will, in turn, become a second dehydration zone, a first dehydration zone, and an activation zone.

From the foregoing, it readily will be seen that there has been provided novel apparatus for treating fluids, either liquid or gaseous; one that is particularly adapted to treat such fluids while under high pressure; and one which provides for one or more passages of the fluid being treated through the apparatus.

While the flows of fluid through the apparatus have been described as entering the top distribution chamber and flowing downward to and out of the bottom distribution chamber, obviously, the flows may be in either direction.

Obviously, too, the present invention is not restricted to the particular embodiment thereof herein shown and described. Moreover, it is not indispensible that all of the features of the invention be used conjointly, since they may be advantageously employed in various combinations and sub-combinations.

What is claimed is:

1. Apparatus for treating fluids comprising a plurality of closed vessels adapted to contain fluid treating material; a pair of cylindrical distribution chambers, each chamber having one end closed by a closure disc having at least two openings formed therein for the passage of fluids and the other end closed by a tube sheet disc having a circular row of circular openings formed therein for the passage of fluids; a group of pipes each connecting one end portion of one of said vessels with one of the circular openings in the tube sheet disc of one of the distribution chambers and a second group of pipes each connecting the other end portion of one of said vessels with one of the circular openings in the tube sheet disc of the other of said distribution chambers; a disc valve rotatably mounted in each of said distribution chambers, each of said disc valves having at least two annular recesses formed in one of its surfaces, at least two circumferentially spaced arc-shaped recesses having equal radii formed in the other of its surfaces, and a plurality of ports therein, each forming a fluid passage connecting one of the annular recesses with one of the arc-shaped recesses, said disc valves being mounted in their respective distribution chambers with each of its annular channels in communication with one of the openings in the adjacent closure disc and with each of its arc-shaped recesses in communication with a group of the circular openings in the adjacent tube sheet disc, the construction and arrangement being such that at least two separate, distinct and continuous flows of fluid may flow through the apparatus; and means for synchronously rotating the disc valves so that the separate flows of fluid will be directed successively through the vessels containing fluid treating material.

2. Apparatus for treating fluids, as set forth in claim 1, wherein each of the annular recesses and each of the arc-shaped recesses formed in the disc valves are sealed off from each other and the space within the distribution chambers by seals.

3. Apparatus for treating fluids, as set forth in claim 2, wherein the distribution chambers and fluid treating material containing vessels are pressure vessels so that all of the flows of fluids through the apparatus may be made under high pressure.

4. Apparatus for treating fluids, as set forth in claim 1, including an upright hollow cylindrical pressure vessel having the distribution chambers mounted on its opposite ends, and wherein the means for rotating the disc valves comprises a vertical shaft extending through said upright cylindrical vessel and said distribution chambers and having the disc valves keyed thereon and a motor and reduction gearing connected to rotate said shaft.

5. Apparatus as set forth in claim 1, wherein each of said closed vessels is provided with a removable cover plate and wherein an elongated annular foraminous container adapted to hold fluid treating material is removably mounted in each of said closed vessels.

6. Apparatus for removing moisture and condensable hydrocarbons from wet natural gas comprising a plurality of stationary closed vessels each containing a bed of silica gel; a pair of stationary cylindrical distribution chambers, each chamber having one end closed by a closure disc having three radially and circumferentially spaced openings formed therein for the passage of fluids and the other end closed by a tube sheet disc having a circular row of circular openings formed therein for the passage of fluids, a group of pipes each connecting one end portion of one of said vessels with one of the circular openings in the tube sheet disc of one of the distribution chambers and a second group of pipes each connecting the other end portion of one of said vessels with one of the circular openings in the tube sheet disc of the other of said distribution chambers; a disc valve rotatably mounted in each of said distribution chambers, each of said disc valves having three annular recesses formed in one of its surfaces, three circumferentially spaced arc-shaped recesses having equal radii formed in the other of its surfaces, and a plurality of ports therein, each forming a fluid passage connecting one of the annular recesses with one of the arc-shaped recesses, said disc valves being mounted in their respective distribution chambers with each of its annular channels in communication with one of its openings in the adjacent closure disc and with each of its arc-shaped recesses in communication with a group of the circular openings in the adjacent tube sheet disc; means including conduits for permitting a continuous flow of heated gas through a corresponding pair of manifolds in the disc valves in the said distribution chambers and the group silica gel containing vessels in communication with the pair of manifolds; means including conduits for permitting a continuous flow of wet natural gas in succession through the second corresponding pair of manifolds and the group of silica gel containing vessels in communication therewith and the third corresponding pair of manifolds and the group of silica gel containing vessels in communication therewith; the construction and arrangement being such that the group of silica gel containing vessels through which the heated gas flows becomes an activation zone, the first group of silica gel containing vessels through which the natural gas flows becomes a first dehydrating zone, and the second group of silica gel containing vessels through which the natural gas flows becomes a second dehydrating zone; and means for synchronously rotating said disc valves so that each group of silica gel containing vessels becomes in succession a second dehydrating zone, a first dehydrating zone and then an activation zone.

7. Apparatus for treating fluids, as set forth in claim 6, wherein each of annular recesses and each of the arc-shaped recesses formed in the disc valves are sealed off from each other and the space within the distribution chambers by seals.

8. Apparatus for treating fluids, as set forth in claim 7, wherein the distribution chambers and fluid treating material containing vessels are pressure vessels so that all of the flows of fluids through the apparatus may be made under high pressure.

9. Apparatus as set forth in claim 6, wherein each of said closed vessels is provided with a removable cover plate and wherein an elongated annular foraminous container adapted to hold fluid treating material is removably mounted in each of said closed vessels.

10. Apparatus as set forth in claim 9, wherein baffle means are mounted in each of said closed vessels and so positioned relative to the foraminous container therein as to produce a substantially uniform flow of fluids through the silica gel container throughout its entire area.

References Cited in the file of this patent

UNITED STATES PATENTS

| | | |
|---|---|---|
| 1,300,869 | Pitts | Apr. 15, 1919 |
| 2,266,031 | Harman-Ashley | Dec. 16, 1941 |
| 2,354,452 | Foregger | July 25, 1944 |
| 2,355,024 | Yerrick et al. | Aug. 1, 1944 |
| 2,450,338 | Heidbrink | Sept. 28, 1948 |
| 2,548,333 | Anderson | Apr. 10, 1951 |
| 2,561,441 | Lou | July 24, 1951 |
| 2,617,986 | Miller | Nov. 11, 1952 |
| 2,635,707 | Gilmore | Apr. 21, 1953 |